(12) United States Patent
Takayama et al.

(10) Patent No.: US 9,183,476 B2
(45) Date of Patent: Nov. 10, 2015

(54) PRINT MANAGEMENT APPARATUS, IMAGE FORMING SYSTEM, AND NON-TRANSITORY COMPUTER READABLE MEDIUM

(71) Applicant: FUJI XEROX Co., Ltd., Minato-ku, Tokyo (JP)

(72) Inventors: Naoya Takayama, Kanagawa (JP); Tsuyoshi Koike, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/956,877

(22) Filed: Aug. 1, 2013

(65) Prior Publication Data

US 2014/0146340 A1    May 29, 2014

(30) Foreign Application Priority Data

Nov. 28, 2012    (JP) ................................. 2012-260405

(51) Int. Cl.
    *G06K 15/00*      (2006.01)
    *G06F 3/12*      (2006.01)

(52) U.S. Cl.
    CPC .............. *G06K 15/402* (2013.01); *G06F 3/121* (2013.01); *G06F 3/1236* (2013.01); *G06F 3/1259* (2013.01); *G06F 3/1285* (2013.01)

(58) Field of Classification Search
    USPC ........................................................ 358/1.15
    See application file for complete search history.

(56) References Cited

U.S. PATENT DOCUMENTS

| | | | | |
|---|---|---|---|---|
| 6,721,791 B1* | 4/2004 | Qiao | ............................ | 709/224 |
| 2005/0134893 A1* | 6/2005 | Han | ............................ | 358/1.14 |
| 2005/0141014 A1* | 6/2005 | Kikuchi et al. | .............. | 358/1.14 |
| 2005/0190395 A1* | 9/2005 | Aritomi | ....................... | 358/1.13 |
| 2006/0274361 A1* | 12/2006 | Kobayashi et al. | .......... | 358/1.15 |
| 2007/0008580 A1 | 1/2007 | Tanaka | | |
| 2008/0106759 A1* | 5/2008 | Okajima | ...................... | 358/1.15 |
| 2008/0151304 A1 | 6/2008 | Matsugashita | | |
| 2008/0174814 A1 | 7/2008 | Nagata | | |
| 2010/0080574 A1* | 4/2010 | Torikoshi | ........................ | 399/19 |
| 2010/0195144 A1* | 8/2010 | Kawai | .......................... | 358/1.15 |

(Continued)

FOREIGN PATENT DOCUMENTS

| | | |
|---|---|---|
| CN | 101206560 A | 6/2008 |
| CN | 102736877 A | 10/2012 |

(Continued)

OTHER PUBLICATIONS

Chinese Office Action issued Apr. 23, 2014 in a corresponding Chinese Patent Application No. 201310404335.5.

*Primary Examiner* — Huo Long Chen
(74) *Attorney, Agent, or Firm* — Sugrue Mion, PLLC

(57) ABSTRACT

A print management apparatus includes a print management unit, a storage unit, and a print controller. The print management unit acquires print information of printing processing performed by an image forming apparatus and performs management of the processing. The storage unit temporarily stores print information acquired by the print management unit. The print controller performs control such that print information that is temporarily stored is transmitted sequentially to the image forming apparatus. Even in a case where the print controller has generated, by mistake, a notification indicating completion of transmission, even though the print controller has not completed transmission of print information, the print management unit detects that there is a page that has not been printed by the image forming apparatus, on the basis of information on the progress of printing from the image forming apparatus.

8 Claims, 12 Drawing Sheets

(56) References Cited

U.S. PATENT DOCUMENTS

2011/0179961 A1* 7/2011 Yanagawa .................. 101/483
2011/0261397 A1* 10/2011 Marunouchi ............... 358/1.15
2012/0257242 A1 10/2012 Imoto

FOREIGN PATENT DOCUMENTS

| JP | 2007-018306 A | 1/2007 |
| JP | 2008-152520 A | 7/2008 |
| JP | 2012-14325 A | 1/2012 |

* cited by examiner

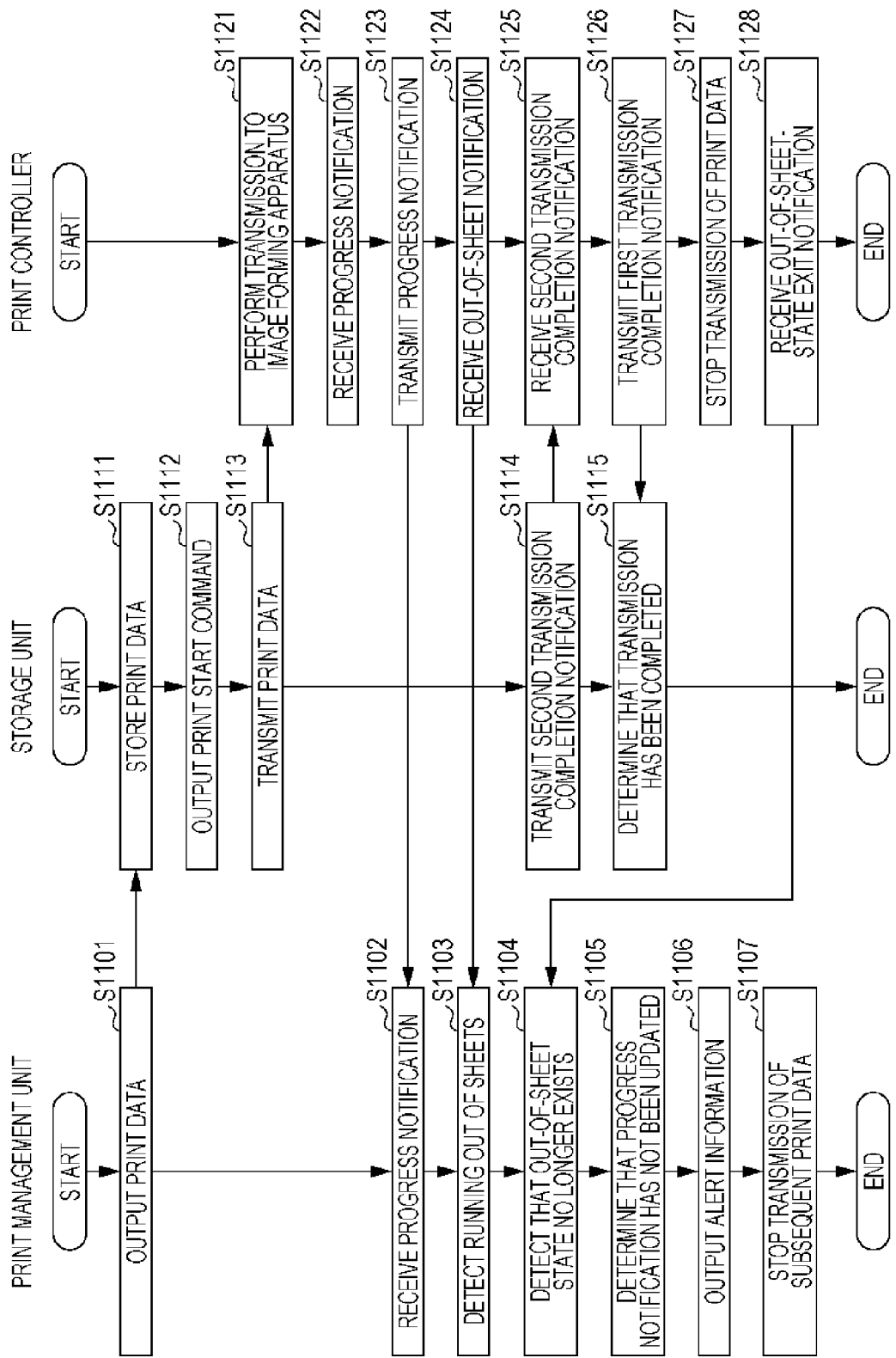

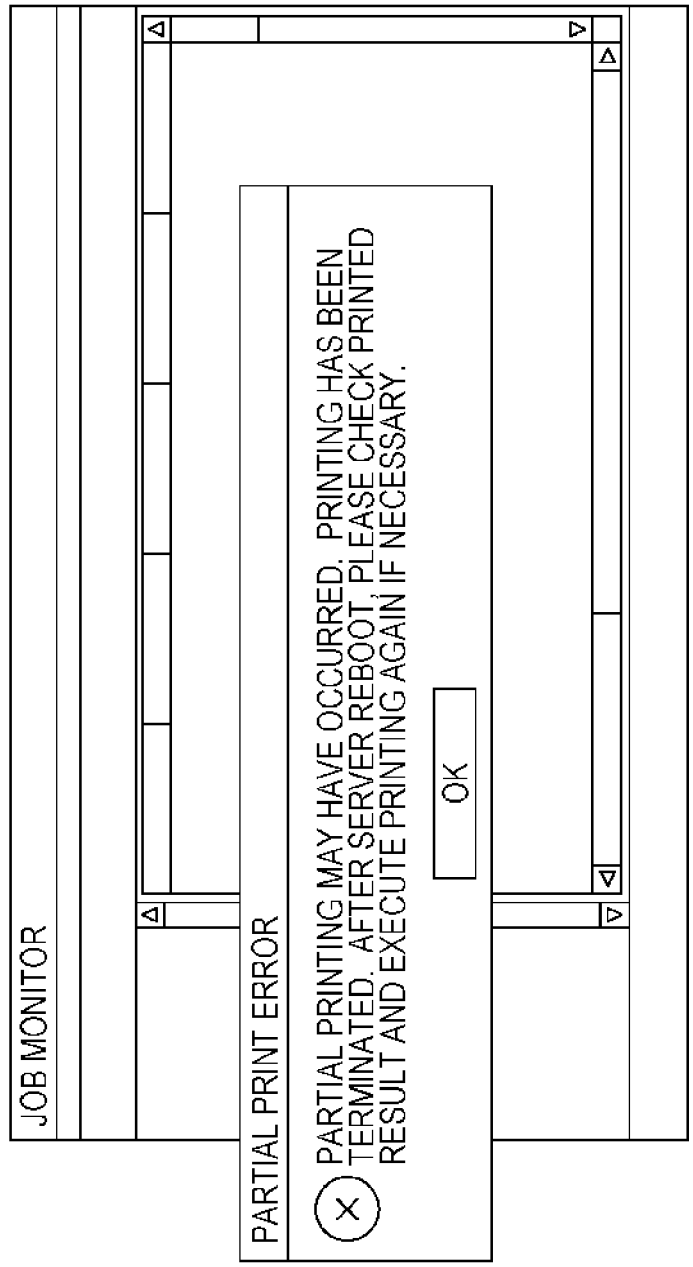

PRINT MANAGEMENT APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-260405 filed Nov. 28, 2012.

BACKGROUND

Technical Field

The present invention relates to a print management apparatus, an image forming system, and a non-transitory computer readable medium.

SUMMARY

According to an aspect of the invention, there is provided a print management apparatus including a print management unit, a storage unit, and a print controller. The print management unit acquires print information of printing processing performed by an image forming apparatus and performs management of the processing. The storage unit temporarily stores print information acquired by the print management unit. The print controller performs control such that print information that is temporarily stored by the storage unit is transmitted sequentially to the image forming apparatus. Even in a case where the print controller has generated, by mistake, a first transmission completion notification indicating completion of transmission, even though the print controller has not completed transmission of print information to the image forming apparatus, the print management unit detects that there is a page that has not been printed by the image forming apparatus, on the basis of information on the progress of printing transmitted from the image forming apparatus.

BRIEF DESCRIPTION OF THE DRAWINGS

An exemplary embodiment of the present invention will be described in detail based on the following figures, wherein:

FIG. 11 is a system flowchart illustrating a procedure of transmission processing performed by the print management unit, the storage unit, and the print controller in the case where print management unit determines that a first transmission completion notification is a false transmission completion notification; and FIG. 12 is a diagram illustrating an example of alert display.

DETAILED DESCRIPTION

In the following, an exemplary embodiment of the present invention will be described in detail with reference to the attached drawings.

System Configuration

Figure 1:
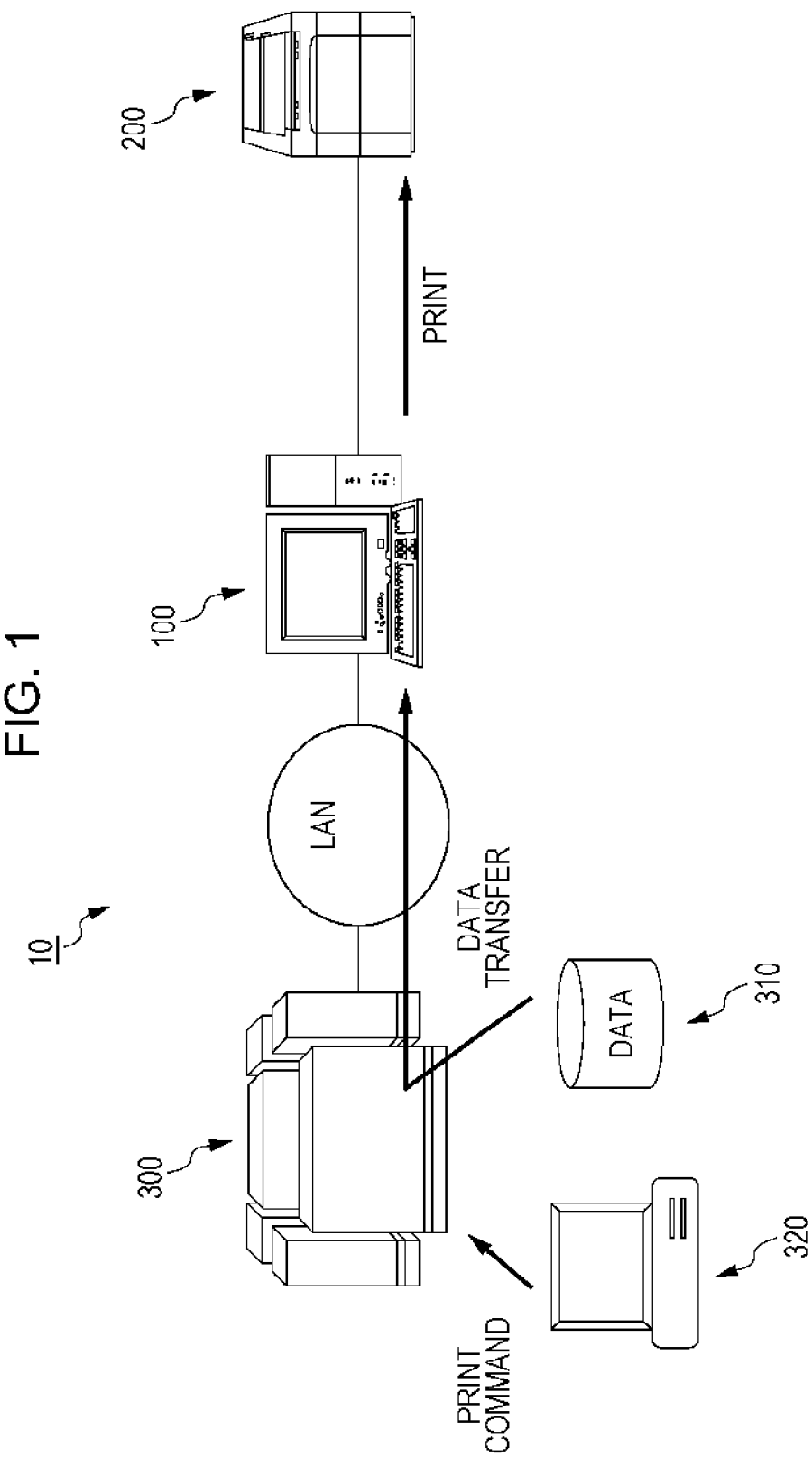
FIG. 1 is a diagram illustrating an example of the configuration of an image forming system to which a present exemplary embodiment is applied.

FIG. 1 is a diagram illustrating an example of the configuration of an image forming system to which a present exemplary embodiment is applied.

An image forming system 10 illustrated in FIG. 1 includes a print server 100 and an image forming apparatus 200. The print server 100 manages print jobs, each of which is processing based on a print command (an output command). The image forming apparatus 200 executes print processing (image forming processing) under control of the print server 100. The print server 100 and the image forming apparatus 200 are connected with each other directly, via a network, or the like and data connection is working therebetween. In addition, the print server 100 is connected to a host server 300 via a local area network (LAN).

The print server 100 is an exemplary print management apparatus that manages printing performed by the image forming apparatus 200. For example, the print server 100 is realized by a personal computer or the like with a network function. The print server 100 receives a print command and print data (print information and output data) from the host server 300 and stores them (spooling). Thereafter, the print server 100 transmits the stored print data to the image forming apparatus 200, and the image forming apparatus 200 executes print processing. A specific functional configuration of the print server 100 will be further described in detail later.

The image forming apparatus 200 acquires print data from the print server 100, forms (prints) an image on a recording medium such as a sheet by using an image forming material on the basis of the acquired print data, and outputs the recording medium. In the present exemplary embodiment, a system used to form images on a recording medium is not particularly specified. Various existing systems including what is called an electrophotographic system and an ink jet system may be used.

The host server 300 is realized by, for example, a computer with a network function. The host server 300 includes a storage device 310, which holds print data. Upon receiving a print command, the host server 300 reads a print target (print data) specified by the print command and transmits the read print target to the print server 100. A print command is input from, for example, a terminal apparatus 320 connected to the host server 300. For example, such a terminal apparatus is realized by, for example, a personal computer that has an input device such as a keyboard.

Functional Configuration of Print Server

Figure 2:
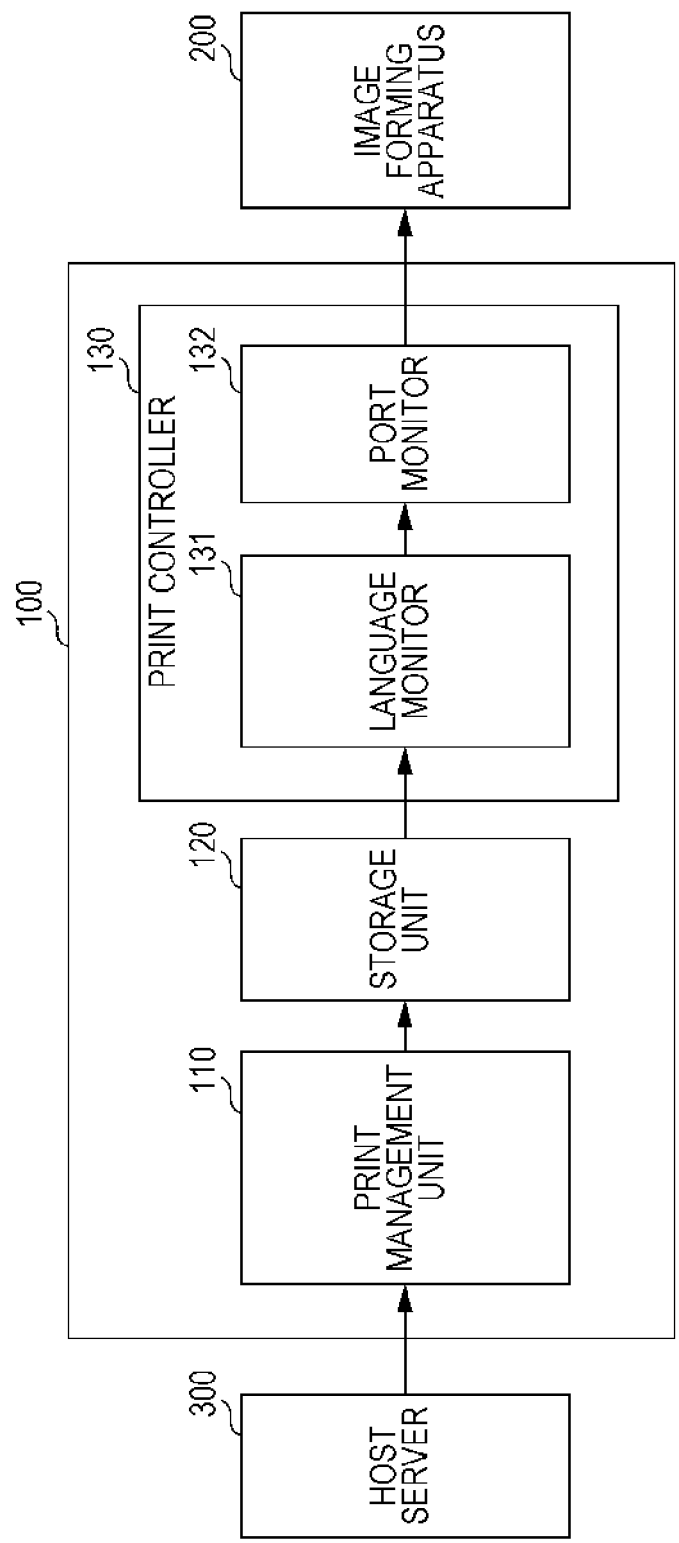
FIG. 2 is a diagram illustrating an example of a functional configuration of a print server in the present exemplary embodiment.

FIG. 2 is a diagram illustrating an example of a functional configuration of the print server 100.

As illustrated in FIG. 2, the print server 100 according to the present exemplary embodiment includes a print management unit 110, a storage unit 120, and a print controller 130. The print management unit 110 acquires print data, performs data processing, and manages print jobs. The storage unit 120 stores print data. The print controller 130 controls the image forming apparatus 200.

The print management unit 110 acquires a print command and print data from the host server 300, converts the acquired print data into intermediate data, and stores the intermediate data in the storage unit 120. Print data received from the host server 300 is expressed in a page description language (PDL). Thus, the print management unit 110 analyzes the received print data and converts the received data into intermediate data, which depends slightly on types of devices and data processing environments used. The print management unit 110 transmits the generated intermediate data to the storage unit 120.

The storage unit 120 temporarily stores the print data, which has been converted into intermediate data by the print management unit 110. The speed of data processing performed by the print server 100 is faster than the speed of image forming physically performed on a recording medium by the image forming apparatus 200. Thus, such print data is stored in order to deal with the difference in speed between data processing performed by the print server 100 and image forming performed by the image forming apparatus 200. As a result, there may be a case where, when plural print commands are issued for a short period of time, plural pieces of print data corresponding to the plural print commands are stored in the storage unit 120. The plural pieces of stored print data are sequentially read and sent to the print controller 130 when the image forming apparatus 200 is ready for accepting print data.

The print controller 130 is what is called a printer driver. When the image forming apparatus 200 is ready for accepting print data, the print controller 130 acquires pieces of print data from the storage unit 120 and performs control such that the pieces of print data are sequentially transmitted to the image forming apparatus 200. As described above, in the case where plural pieces of print data are stored in the storage unit 120, every time print processing is finished in the image forming apparatus 200, the print controller 130 acquires a piece of print data, which is stored, in a sequential manner and transmits the piece of print data to the image forming apparatus 200.

In addition, in the present exemplary embodiment, the print controller 130 includes a language monitor 131 and a port monitor 132. For example, the language monitor 131 processes two-way communication between the storage unit 120 and the image forming apparatus 200 and performs processing to send print data to the port monitor 132. The port monitor 132 transmits the print data, which has been sent from the language monitor 131, to the image forming apparatus 200.

Example of Hardware Configuration

Figure 3:
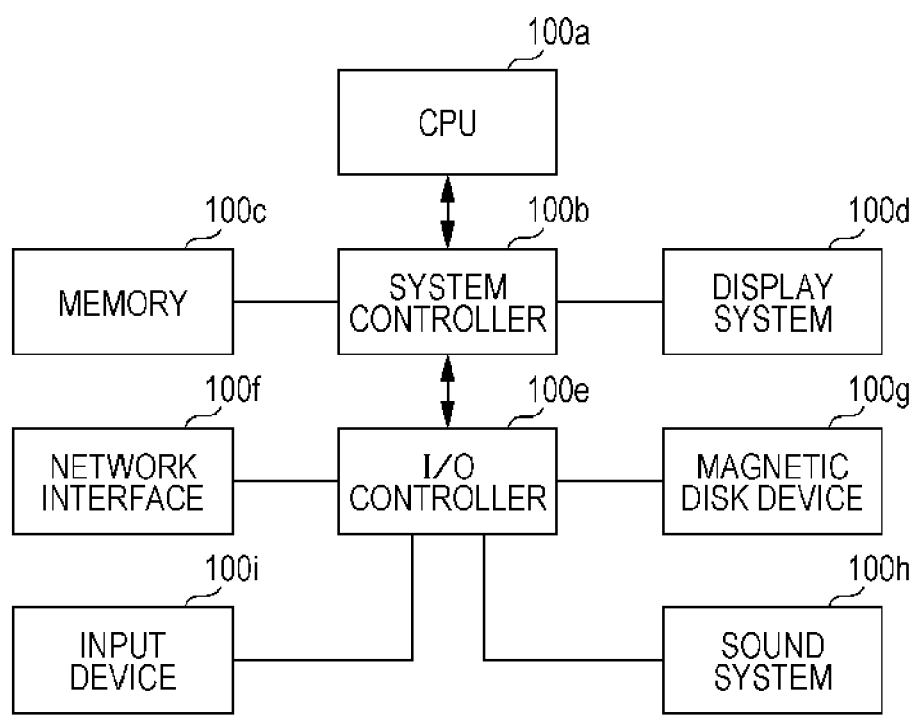
FIG. 3 is a diagram illustrating an example of a hardware configuration of the print server.

FIG. 3 is a diagram illustrating an example of a hardware configuration of the print server 100.

A computer illustrated in FIG. 3 includes a central processing unit (CPU) 100a, which serves as a computation unit, and a memory 100c, which serves as a main memory. In addition, the computer includes, as external devices, a magnetic disk device (hard disk drive (HDD)) 100g, a network interface 100f, a display system 100d, a sound system 100h, an input device 100i such as a keyboard and a mouse, and the like.

In the example of a hardware configuration illustrated in FIG. 3, the memory 100c and the display system 100d are connected to the CPU 100a via a system controller 100b. The network interface 100f, the magnetic disk device 100g, the sound system 100h, and the input device 100i are connected to the system controller 100b via an input/output (I/O) controller 100e. The components of the computer are connected with each other via various buses such as a system bus and an I/O bus.

Note that FIG. 3 just illustrates an example of a preferred hardware configuration of a computer to which the present exemplary embodiment is applied. The present exemplary embodiment may be applied widely to information processing systems that perform computation and run a simulation. The present exemplary embodiment is realized not only with the structure illustrated in FIG. 3 but also with other structures.

In the computer illustrated in FIG. 3, programs that realize functions of the print server 100 are stored in the magnetic disk device 100g. These functions are each realized when the programs are loaded into the memory 100c and processing based on the programs is executed by the CPU 100a.

Specifically, the CPU 100a performs processing in the print management unit 110 on the basis of a program prepared as, for example, an application program or the like. Note that a print command and print data are received from the host server 300 via, for example, the network interface 100f. In addition, when print data is converted, the memory 100c is used as a work memory.

The storage unit 120 is realized by using, as a print-data storage unit, a memory such as the memory 100c or the magnetic disk device 100g under control of the CPU 100a executing a program module, an example of the program module being prepared as, for example, a part of functions of the operating system (OS).

Processing in the print controller 130 is performed by the CPU 100a on the basis of a program module, an example of the program module being prepared as, for example, a part of functions of the OS.

Operation of Printer Server

Figure 4:
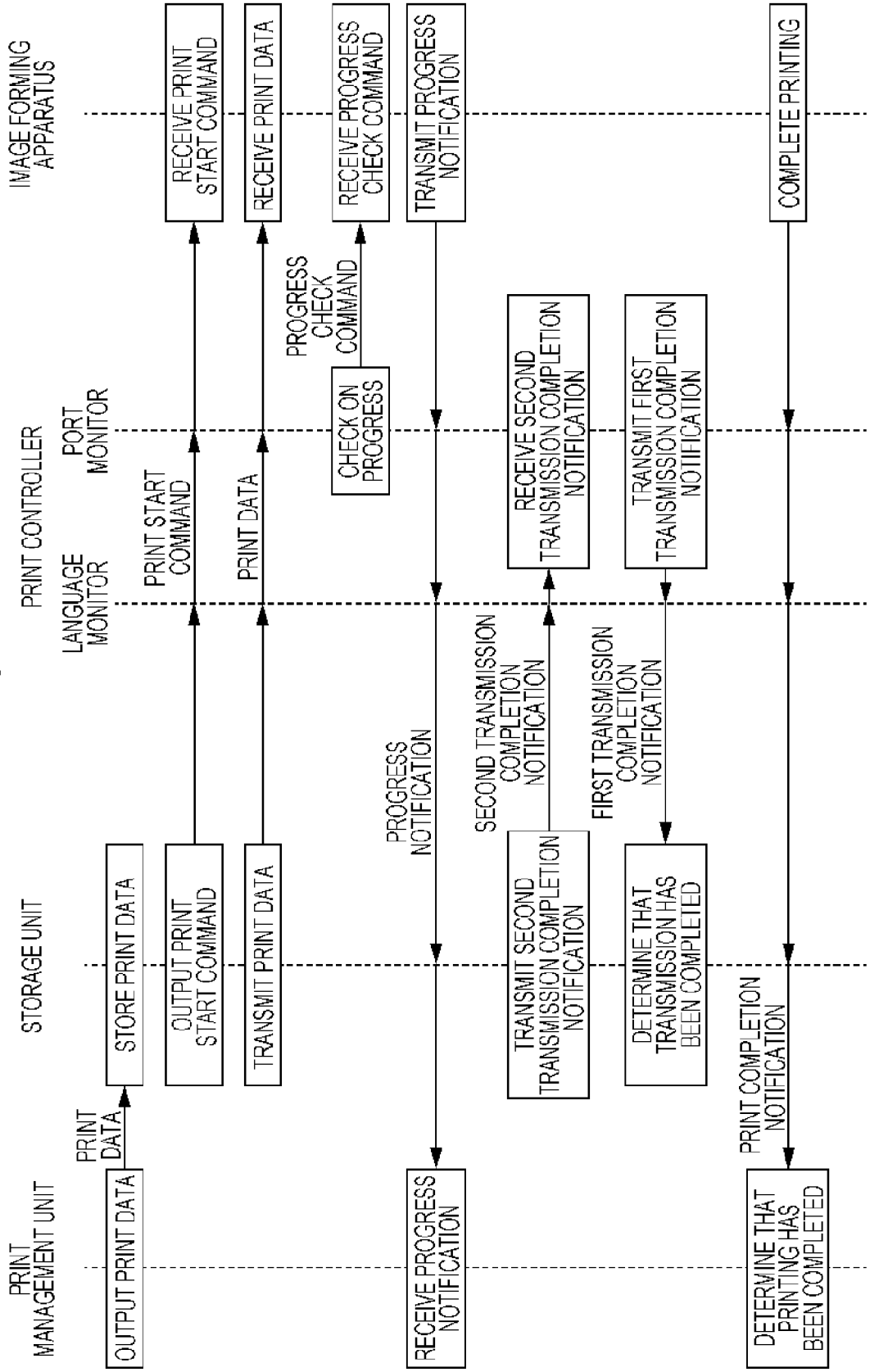
FIG. 4 is a sequence diagram illustrating an example of information exchange performed between a print management unit, a storage unit, and function units of a print controller in the print server, and an image forming apparatus.
Figure 5:
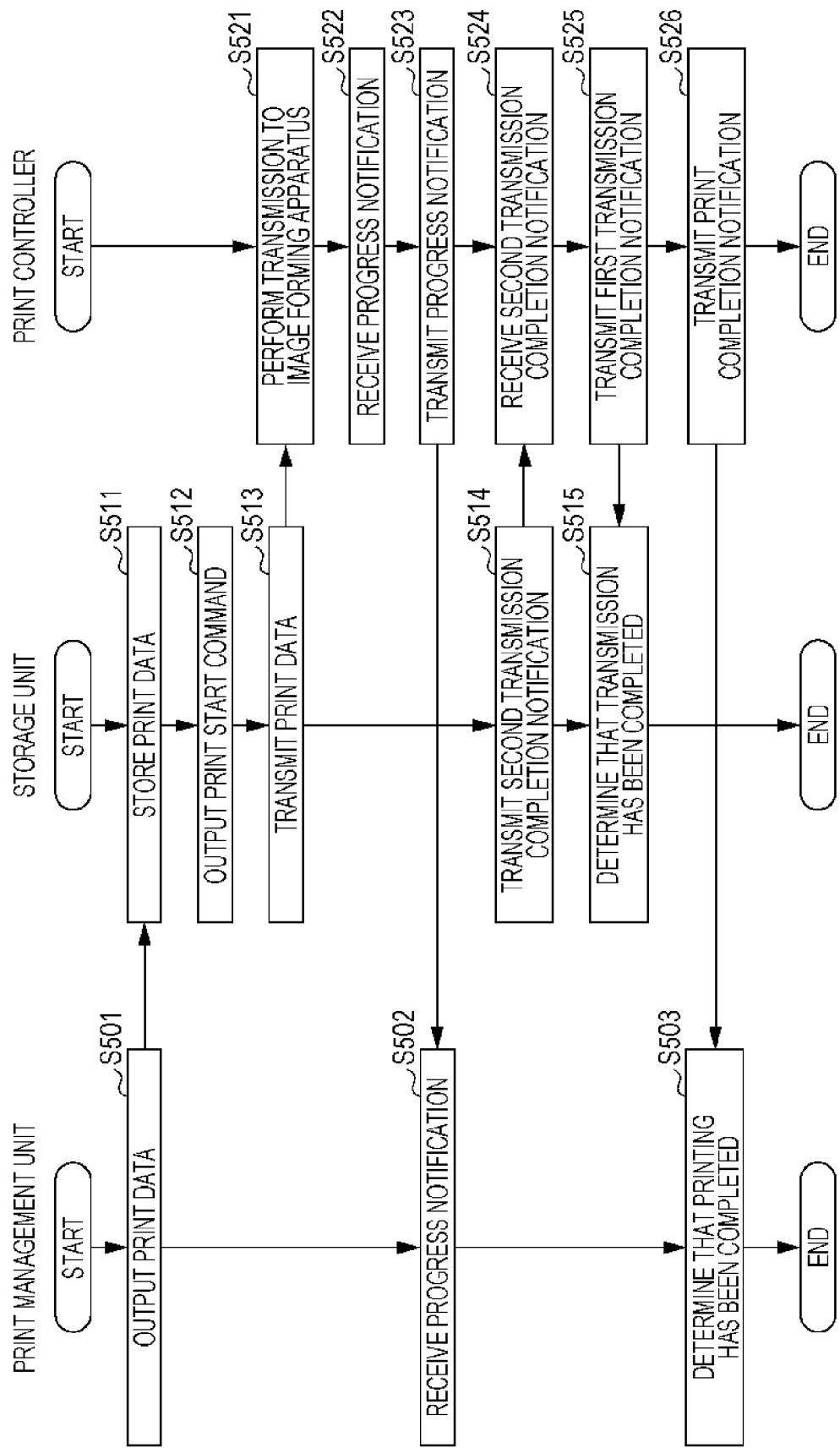
FIG. 5 is a system flowchart illustrating a procedure of transmission processing performed by the print management unit, the storage unit, and the print controller.

FIG. 4 is a sequence diagram illustrating an example of information exchange performed between the print management unit 110, the storage unit 120, and function units of the print controller 130 in the print server 100 and the image forming apparatus 200. FIG. 5 is a system flowchart illustrating a procedure of transmission processing performed by the print management unit 110, the storage unit 120, and the print controller 130.

When output processing is started for a print job subjected to processing (hereinafter referred to as a subject (current) job), the print management unit 110 outputs print data (intermediate data) (in step S501). The print data is stored in the storage unit 120 (in step S511). Specifically, the print management unit 110 outputs print data of one page and stores the print data of one page in the storage unit 120. This is repeatedly performed until print data of all pages has been stored in the storage unit 120. After the print management unit 110 has output print data of all pages of a subject job, the print management unit 110 ends output processing for the subject job.

When the image forming apparatus 200 is ready for performing printing and accepting print commands, the storage unit 120 first determines a subject job and outputs a print start command (in step S512). This print start command is transmitted to the image forming apparatus 200 via the language monitor 131 and the port monitor 132 of the print controller 130. Note that whether or not the image forming apparatus 200 is ready for accepting print data is determined by the storage unit 120. Such determination is performed, for example, on the basis of a response transmitted from the image forming apparatus 200 to the storage unit 120 in response to a query signal transmitted from the port monitor 132 to the image forming apparatus 200.

Next, the storage unit 120 reads print data of the subject job on a page-by-page basis in a sequential manner and sends read print data to the print controller 130 (in step S513). The print controller 130 transmits the acquired print data to the image forming apparatus 200 by using the language monitor 131 and the port monitor 132 (in step S521). Here, the port monitor 132 performs polling for the image forming apparatus 200 at predetermined time intervals to check on the progress of printing, and receives a progress notification from the image forming apparatus 200, the progress notification being information on the progress of printing (in step S522). This progress notification contains information indicating the page number at which the image forming apparatus 200 has finished printing. The progress notification is transmitted to the print management unit 110 (in step S523). The print management unit 110 sequentially receives progress notifications such as this (in step S502).

In the case where the storage unit 120 has transmitted all the print data of the subject job to the print controller 130, the storage unit 120 transmits a transmission completion notification indicating that transmission of the print data of the subject job has been completed (a second transmission completion notification) (in step S514). The print controller 130 receives this second transmission completion notification (in step S524). As a result, the print controller 130 may determine that all the print data of the subject job is in a transmission completion state.

Thereafter, in the case where transmission of all the print data of the subject job to the image forming apparatus 200 has been completed, the port monitor 132 transmits, to the storage unit 120, a transmission completion notification indicating that transmission has been completed (a first transmission completion notification) (in step S525). Upon receiving the first transmission completion notification, the storage unit 120 determines that the print data of the subject job has been transmitted to the image forming apparatus 200 and is in a transmission completion state (in step S515).

Furthermore, when the port monitor 132 receives, from the image forming apparatus 200, a print completion notification indicating that printing of a subject job has been completed, the print completion notification is transmitted to the print management unit 110 (in step S526). As a result, the print management unit 110 determines that the subject job is in a print completion state (in step S503).

In this way, transmission processing for one print job is completed. Thereafter, in the case where print data for another print job is stored in the storage unit 120, transmission processing is repeated likewise.

Here, while a subject job is being printed, the image forming apparatus 200 may enter a state in which it is impossible to perform printing. This happens, for example, when recording mediums used to form images are used up, that is, no more sheets are left, when toner or ink, which is a image forming material, is used up, or when a recording-medium jam occurs within the image forming apparatus 200.

In the following, the operation of the print server 100 in this case will be described.

Figure 6:
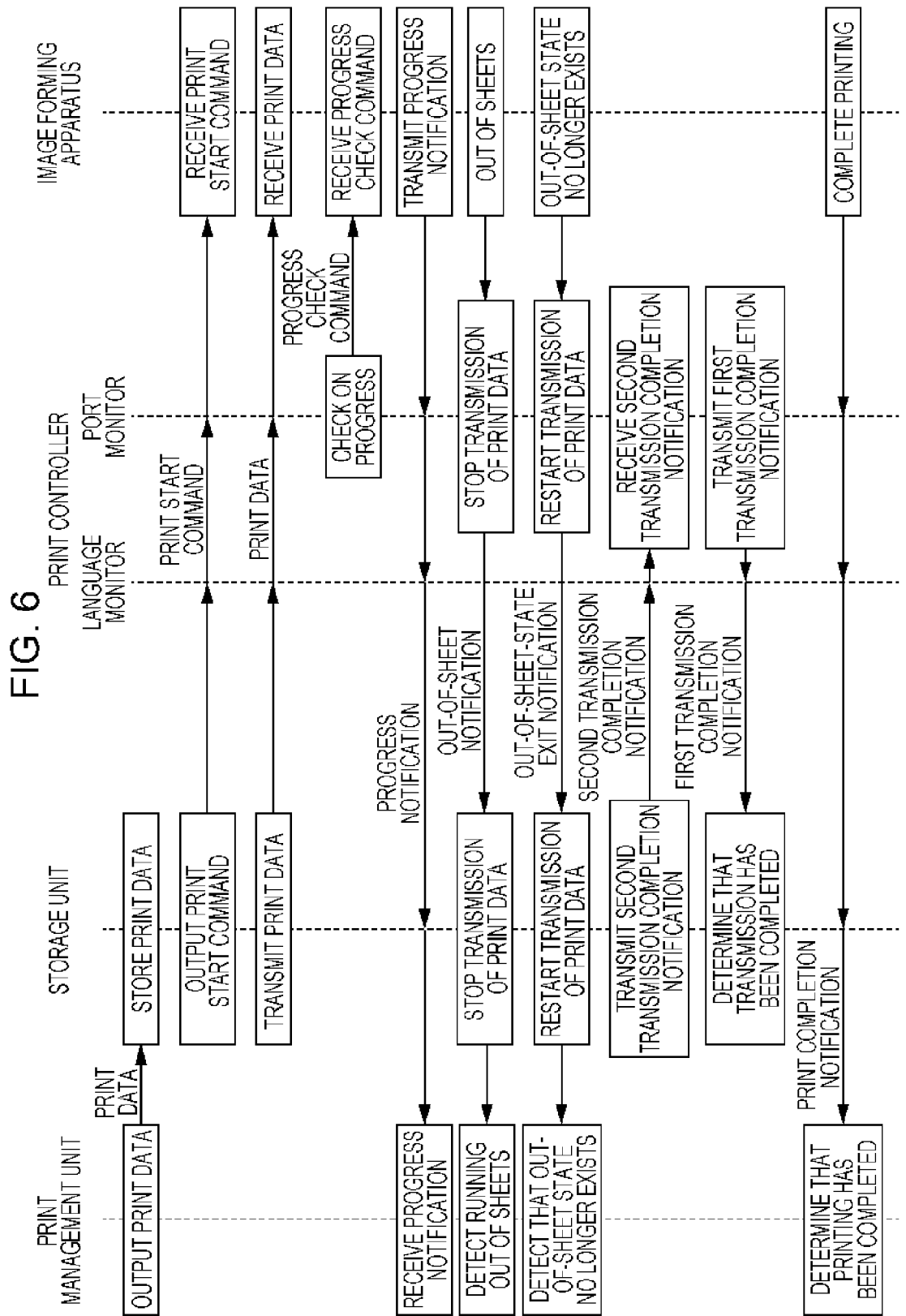
FIG. 6 is a sequence diagram illustrating an example of information exchange performed between the print management unit, the storage unit, the function units of the print controller, and the image forming apparatus in the case where the image forming apparatus has entered a state in which it is impossible to perform printing while a subject job is being printed.
Figure 7:
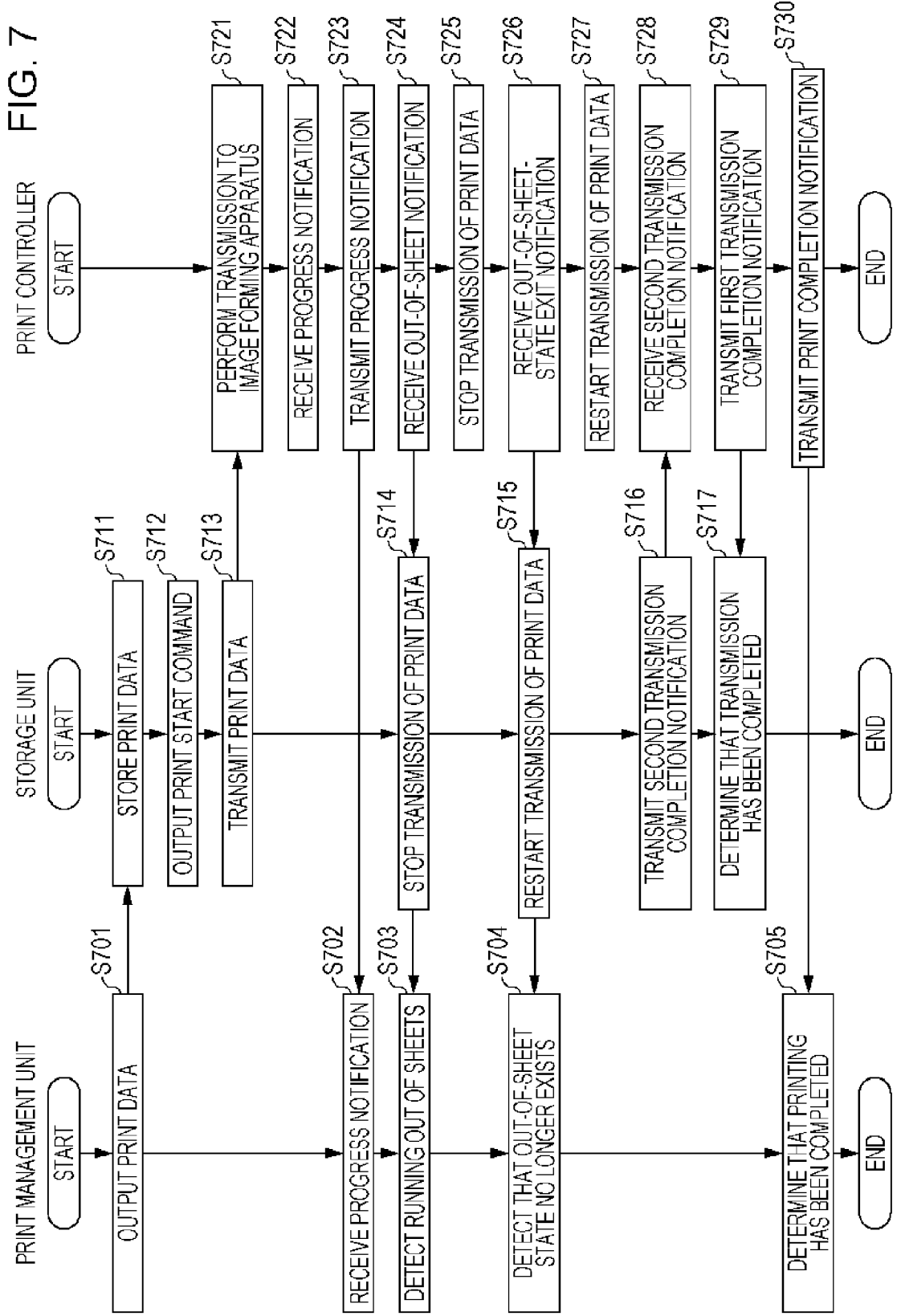
FIG. 7 is a system flowchart illustrating a procedure of transmission processing performed by the print management unit, the storage unit, and the print controller in the case where the image forming apparatus has entered a state in which it is impossible to perform printing while a subject job is being printed.

FIG. 6 is a sequence diagram illustrating an example of information exchange performed between the print management unit 110, the storage unit 120, the function units of the print controller 130, and the image forming apparatus 200 in the case where the image forming apparatus 200 has entered an out-of-sheet state in which it is impossible to perform printing while a subject job is being printed. FIG. 7 is a system flowchart illustrating a procedure of transmission processing performed by the print management unit 110, the storage unit 120, and the print controller 130 in this case.

Here, description will be made by using, as an example, a case where the image forming apparatus 200 has run out of sheets in the above-described step S521 while the print controller 130 is transmitting the acquired print data to the image forming apparatus 200.

The procedures from step S701 to step S702, from step S711 to step S713, and from step S721 to step S723 in FIG. 7 are almost the same as the procedures from step S501 to step S502, from step S511 to step S513, and from step S521 to step S523 in FIG. 5, respectively. Thus, description thereof will be omitted.

In step S721 in FIG. 7, in the case where the image forming apparatus 200 has run out of sheets while the print controller 130 is transmitting print data of a subject job to the image forming apparatus 200, the image forming apparatus 200 stops printing and transmits, to the port monitor 132, an out-of-sheet notification indicating that the image forming apparatus 200 has run out of sheets. The port monitor 132 receives this out-of-sheet notification (in step S724) and stops transmission of print data of the subject job to the image forming apparatus 200 (in step S725). Furthermore, this out-of-sheet notification is also transmitted from the port monitor 132 to the storage unit 120. As a result, the storage unit 120 stops transmission of the print data of the subject job (in step S714). Furthermore, this out-of-sheet notification is also transmitted to the print management unit 110. As a result, the print management unit 110 detects that the image forming apparatus 200 has run out of sheets (in step S703).

When sheets are reloaded and an out-of-sheet state no longer exists for the image forming apparatus 200, the image forming apparatus 200 restarts printing and transmits, to the port monitor 132, an out-of-sheet-state exit notification indicating that the out-of-sheet state no longer exists. The port monitor 132 receives this out-of-sheet-state exit notification (in step S726), and restarts transmission of print data of the subject job to the image forming apparatus 200 (in step S727). Furthermore, here, the out-of-sheet-state exit notification is transmitted from the port monitor 132 to the storage unit 120. As a result, the storage unit 120 restarts transmission of print data of the subject job (in step S715). The out-of-sheet-state exit notification is further also transmitted to the print management unit 110. As a result, the print management unit 110 detects that the out-of-sheet state no longer exists for the image forming apparatus 200 (in step S704).

Thereafter, the procedures in step S705, from step S716 to step S717, and from step S728 to step S730 are almost the same as the procedures in step S503, from step S514 to step S515, and from step S524 to step S526 in FIG. 5, respectively. Thus, description thereof will be omitted.

Here, there may be a case where the port monitor 132 of the print controller 130 generates, by mistake, a transmission completion notification indicating completion of transmission (the first transmission completion notification), even though transmission of all the print data of a subject job to the image forming apparatus 200 has not been completed.

Such a false first transmission completion notification is generated, for example, when the print controller 130 receives, from the storage unit 120, a transmission completion notification indicating that transmission of the print data of a print job has been completed (the second transmission completion notification) and also receives, from the image forming apparatus 200, a notification indicating that it is impossible to perform printing (for example, the out-of-sheet notification described above). That is, such a false first transmission completion notification is generated when the second transmission completion notification and the out-of-sheet notification or the like are received almost at the same time.

Such a false first transmission completion notification tends to be generated especially in the case where Windows (registered trademark) produced by Microsoft Corporation is used as the OS of the print server 100. Furthermore, regardless of what version of Windows (registered trademark), such a false first transmission completion notification may be generated.

In the following, description will be made with respect to operation and issues of the print server 100 when a false first transmission completion notification is generated.

Figure 8:
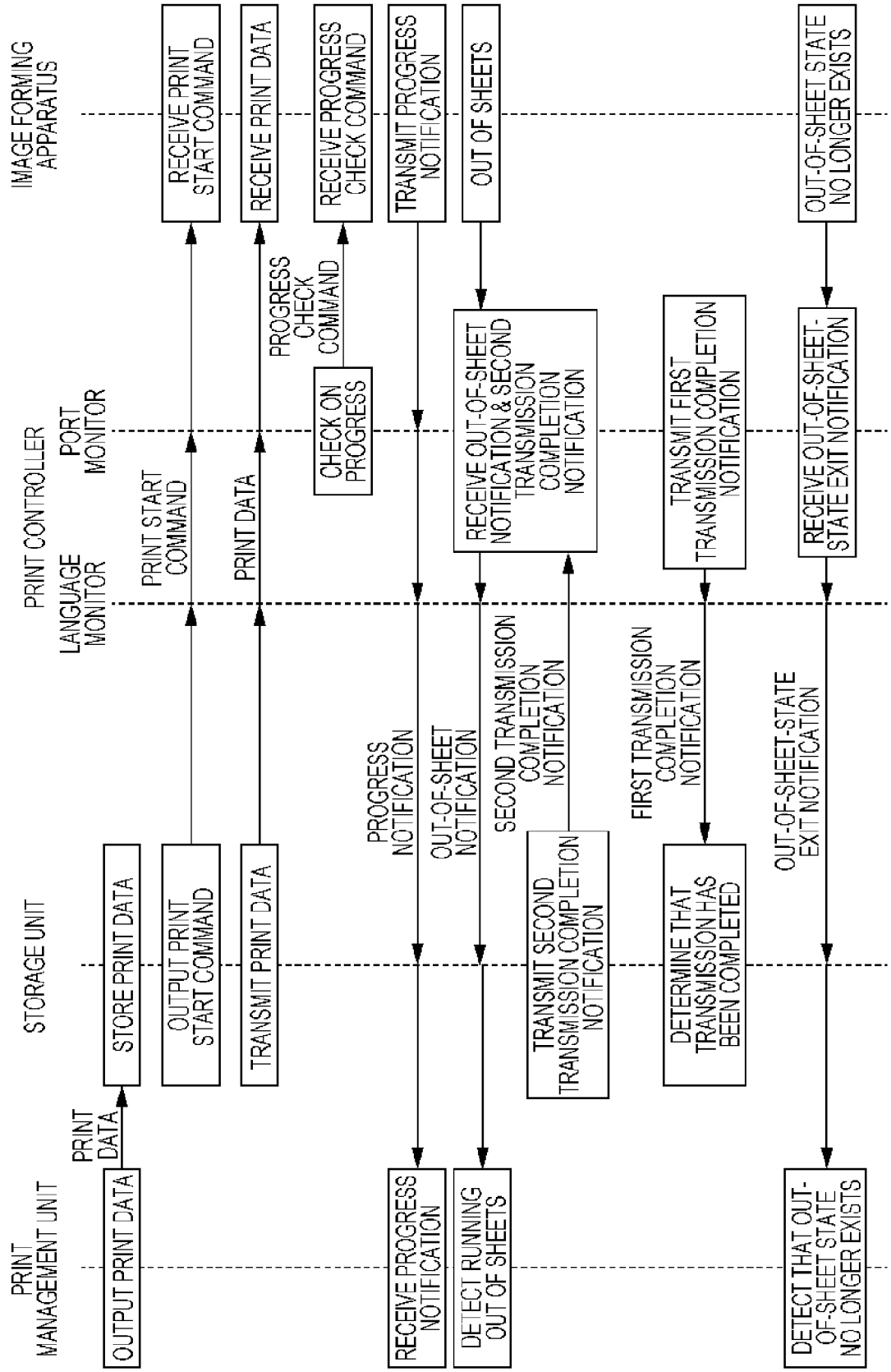
FIG. 8 is a sequence diagram illustrating an example of information exchange performed between the print management unit, the storage unit, the function units of the print controller, and the image forming apparatus when a false first transmission completion notification is generated.
Figure 9:
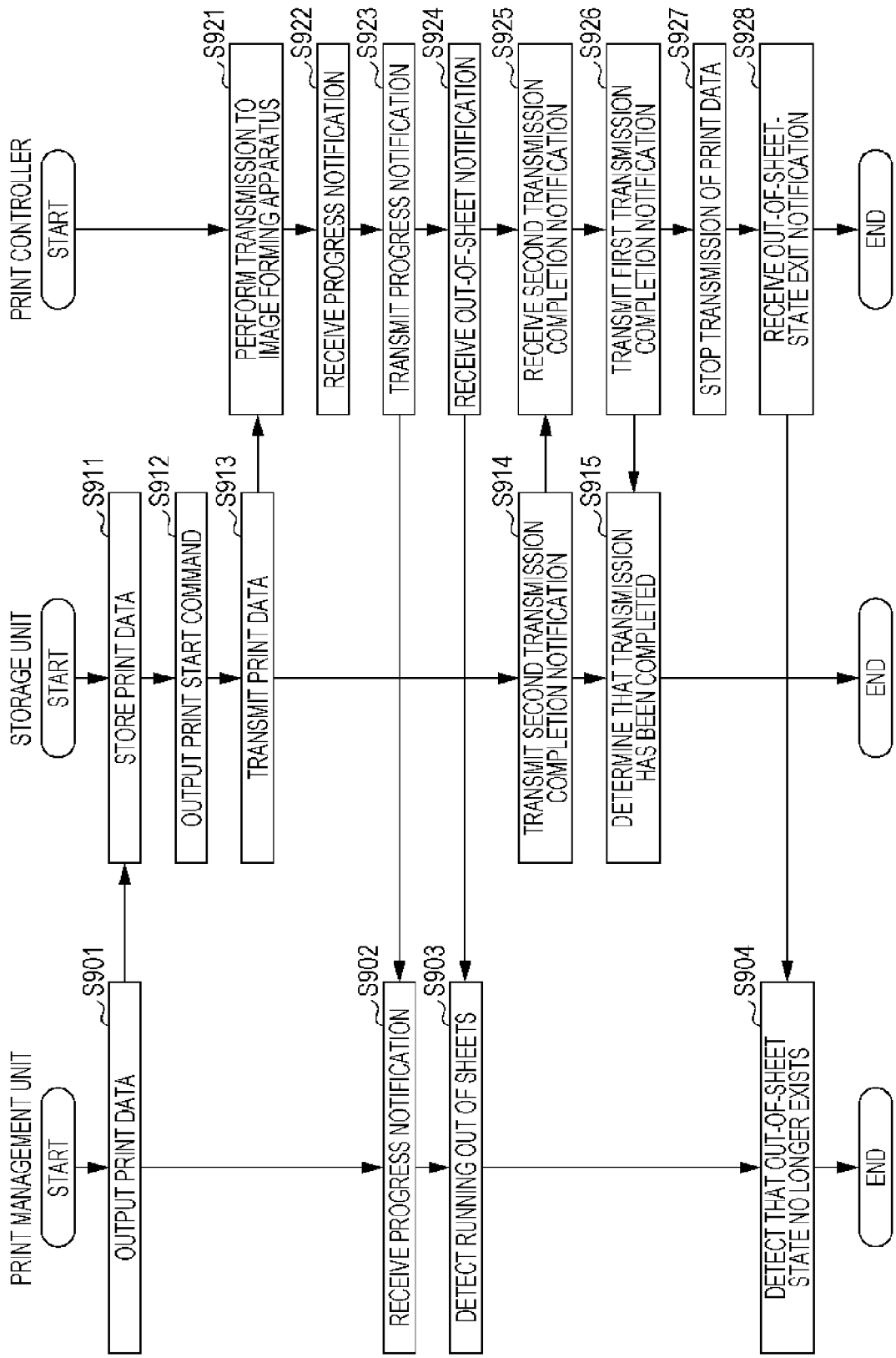
FIG. 9 is a system flowchart illustrating a procedure of transmission processing performed by the print management unit, the storage unit, and the print controller when a false first transmission completion notification is generated.

FIG. 8 is a sequence diagram illustrating an example of information exchange performed between the print management unit 110, the storage unit 120, the function units of the print controller 130, and the image forming apparatus 200 when a false first transmission completion notification is generated. FIG. 9 is a system flowchart illustrating a procedure of transmission processing performed by the print management unit 110, the storage unit 120, and the print controller 130 in this case.

The procedures from step S901 to step S902, from step S911 to step S913, and from step S921 to step S923 in FIG. 9 are almost the same as the procedures from step S501 to step S502, from step S511 to step S513, and from step S521 to step S523 in FIG. 5, respectively. Thus, description thereof will be omitted.

In the case where the image forming apparatus 200 has run out of sheets while print data is being transmitted in step S921 in FIG. 9, the image forming apparatus 200 stops printing and transmits, to the port monitor 132, an out-of-sheet notification indicating that the image forming apparatus 200 has run out of sheets. When all the print data of a subject job is transmitted from the storage unit 120 to the print controller 130, the storage unit 120 transmits a transmission completion notification indicating that transmission of the print data of the subject job has been completed (the second transmission completion notification) (in step S914).

Here, the port monitor 132 receives the second transmission completion notification transmitted from the storage unit 120 and the out-of-sheet notification transmitted from the image forming apparatus 200 almost at the same time (in steps S924 and S925). Note that the out-of-sheet notification is also transmitted to the print management unit 110. As a result, the print management unit 110 detects that the image forming apparatus 200 has run out of sheets (in step S903).

Then, the port monitor 132 generates, by mistake, a transmission completion notification indicating completion of transmission (the first transmission completion notification), even though transmission of all the print data of the subject job to the image forming apparatus 200 has not been completed.

The first transmission completion notification is transmitted to the storage unit 120 (in step S926). Upon receiving this first transmission completion notification, the storage unit 120 determines that the print data of the subject job has been transmitted to the image forming apparatus 200 and is in a transmission completion state (in step S915).

In contrast, the port monitor 132 does not transmit, to the image forming apparatus 200, the last block of data from among print data that needs to be transmitted to the image forming apparatus 200 and stops transmission (in step S927).

When sheets are reloaded into the image forming apparatus 200 and the out-of-sheet state no longer exists, the image forming apparatus 200 restarts printing and transmits, to the port monitor 132, an out-of-sheet-state exit notification indicating that the out-of-sheet state no longer exists. The out-of-sheet-state exit notification is received by the port monitor 132 (in step S928) and is further transmitted to the print management unit 110. As a result, the print management unit 110 detects that the out-of-sheet state no longer exists in the image forming apparatus 200 (in step S904).

However, since all the print data of the subject job is not transmitted to the image forming apparatus 200, the print data is incomplete. Thus, all pages of this subject job are not printed. For example, the last maximum 20 pages are not printed and partial printing occurs. Moreover, the print completion notification described in step S730 in FIG. 7 is not generated in the image forming apparatus 200. As a result, it is not possible for the print management unit 110 to determine that the subject job has been changed to be in a print completion state.

The present exemplary embodiment addresses this issue by detecting generation of a false first transmission completion notification and by outputting alert information, the detection and output being performed by the print management unit 110.

In the present exemplary embodiment, the print management unit 110 determines that a first transmission completion notification is a false transmission completion notification on the basis of notification information transmitted from the image forming apparatus 200. More specifically, the print management unit 110 determines whether or not the progress of the subject job is being stopped, even though the subject job is in a state in which processing of the subject job does not have to be stopped at all, in accordance with information of a notification transmitted from the image forming apparatus 200. When the progress of the subject job is being stopped, even though the subject job is in a state in which processing of the subject job does not have to be stopped at all, the print management unit 110 determines that the first transmission completion notification is a false transmission completion notification.

When a false first transmission completion notification is generated, the last block of data from among the print data is not transmitted to the image forming apparatus 200. In addition, a print completion notification is not generated. Furthermore, a progress notification, which is information on the progress of printing, is not transmitted from the image forming apparatus 200. From the print server 100, it seems that processing of a print job is being stopped.

Thus, in the present exemplary embodiment, the print management unit 110 sets the following conditions which when met indicate that a false first transmission completion notification has been generated.

1. Printing of a subject job is being executed in the print management unit 110 because a print completion notification has not yet been generated.
2. The image forming apparatus 200 is not in a state in which printing needs to be stopped, such as the image forming apparatus 200 has run out of sheets.
3. The state of progress of printing is not updated because a progress notification, which is information on the progress of printing, is not transmitted from the image forming apparatus 200.

When all of the conditions 1 to 3 are met, the print management unit 110 determines that a false first transmission completion notification has been generated and partial printing has occurred.

Figure 10:
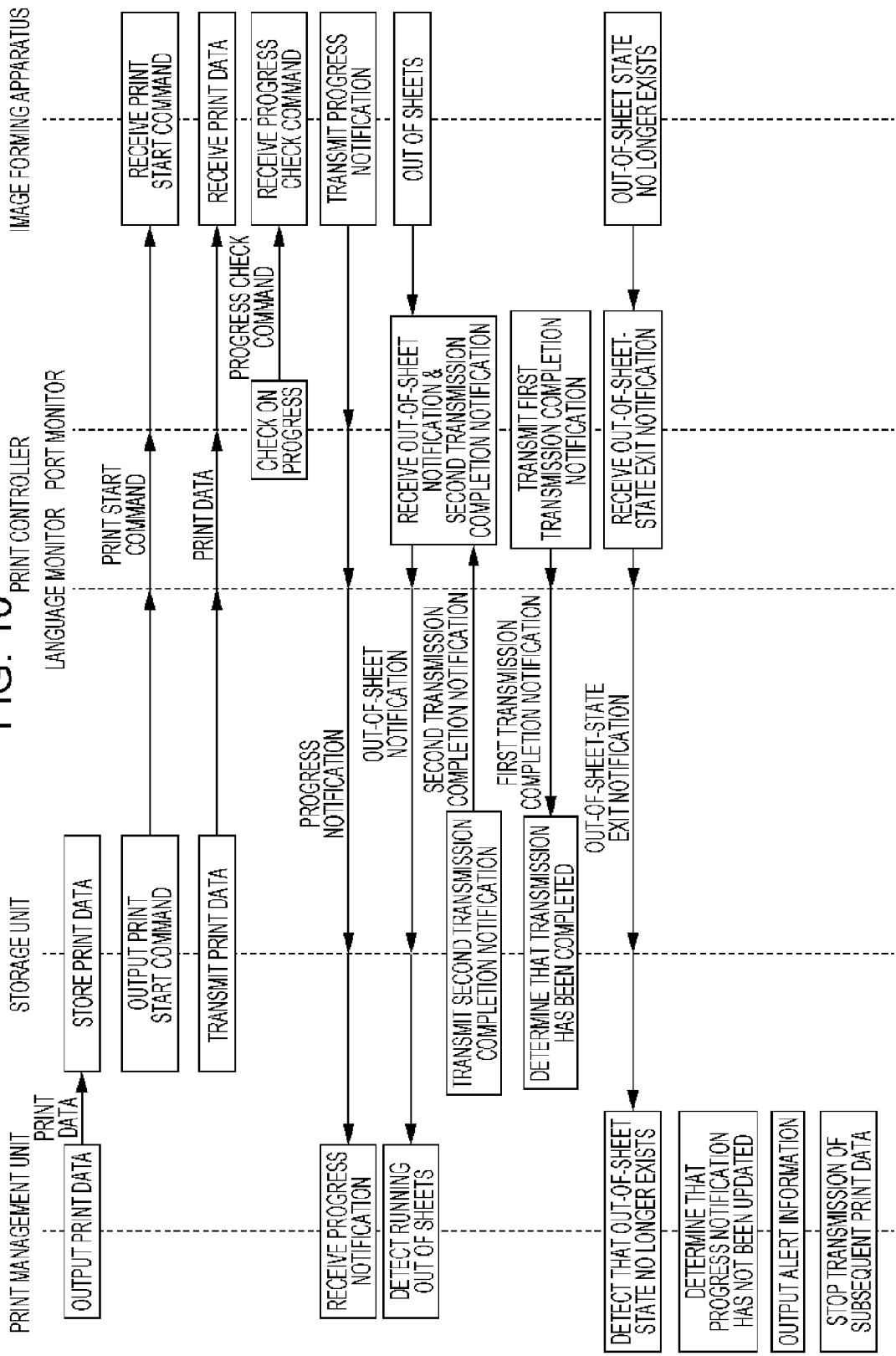
FIG. 10 is a sequence diagram illustrating an example of information exchange performed between the print management unit, the storage unit, the function units of the print controller, and the image forming apparatus in the case where print management unit determines that a first transmission completion notification is a false transmission completion notification.

FIG. 10 is a sequence diagram illustrating an example of information exchange performed between the print management unit 110, the storage unit 120, the function units of the print controller 130, and the image forming apparatus 200 in the case where print management unit 110 determines that a first transmission completion notification is a false transmission completion notification. FIG. 11 is a system flowchart illustrating a procedure of transmission processing performed by the print management unit 110, the storage unit 120, and the print controller 130 in this case.

The procedures from step S1101 to step S1104, from step S1111 to step S1115, and from step S1121 to step S1128 in FIG. 11 are almost the same as the procedures from step S901 to step S904, from step S911 to step S915, and from step S921 to step S928 in FIG. 9, respectively. Thus, description thereof will be omitted.

After having detected that the out-of-sheet state no longer exists in the image forming apparatus 200, the print management unit 110 monitors a progress notification. The print management unit 110 determines that the progress notification has not been updated within a predetermined time period (in step S1105). After having made such a determination, the print management unit 110 outputs alert information (in step S1106). Furthermore, the print management unit 110 stops transmission of print data of the subject job and subsequent print jobs (in step S1107).

In this case, since a print completion notification is not transmitted to the print management unit 110, printing is in an execution state in the print management unit 110 and the condition 1 is met. In addition, since the print management unit 110 has detected that the out-of-sheet state no longer exists in the image forming apparatus 200, the image forming apparatus 200 is not in the state in which printing needs to be stopped and the condition 2 is met. Furthermore, since the print management unit 110 has determined that the progress notification has not been updated in step S1105, the condition 3 is met. Therefore, the above-described conditions 1 to 3 are all met.

Note that, the case where a progress notification has been updated within the predetermined time period is a case where, as illustrated in FIG. 7, a false first transmission completion notification is not generated. Thus, the print management unit 110 simply waits for a print completion notification in step S705.

Here, the print management unit 110 performs alert display, for example, on the display system 100d such as a liquid crystal display (see FIG. 3) and draws attention of an administrator of the image forming system 10.

FIG. 12 is a diagram illustrating an example of alert display.

Here, as alert display, the print management unit 110 displays "Partial Print error" and "Partial printing may have occurred. Printing has been terminated. After server reboot, please check printed result and execute printing again if necessary."

Description of Program

Here, processing performed by the print management unit 110 of the print server 100 in the present embodiment, which has been described above, is prepared as, for example, an application program as described with reference to FIG. 3. In addition, the alert display described with reference to FIG. 12 is also performed by this application program.

Thus, processing performed by the print management unit 110 may be regarded as a program causing a computer to acquire print data of a print job, which is to be subjected to printing performed by the image forming apparatus 200, and to realize a print management function with which print jobs are managed. A program that is operated in the print controller 130 performs control such that print data temporarily stored in the storage unit 120 or the like is transmitted in a sequential manner. With this print management function, when the program generates, by mistake, a false first transmission completion notification indicating completion of transmission, even though transmission of print data to the image forming apparatus 200 has not been completed, it is determined that a first transmission completion notification is a false transmission completion notification on the basis of notification information transmitted from the image forming apparatus 200.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management apparatus comprising:
 a processor that controls the print management apparatus to implement a print management unit configured to acquire, from a host server, print data to be processed by an image forming apparatus, and receive printing progress information that indicates whether at least one page of the print data has been printed by the image forming apparatus, a print completion notification that indicates printing of the print data by the image forming apparatus is complete, and an error resolution notification that indicates resumption of suspended printing of the print data by the image forming apparatus due to an error condition suspending the printing of the print data by the image forming apparatus;
 a storage configured to store the print data acquired by the print management unit; and
 a print driver configured to transmit the print data stored in the storage to the image forming apparatus,
 wherein the print management unit is further configured to determine that partial printing of less than all pages of the print data by the image forming apparatus has occurred when:

the print management unit determines that the image forming apparatus is not in an error state due to the error resolution notification indicating resumption of suspended printing of the print data by the image forming apparatus, the print management unit determines that printing by the image forming apparatus is currently in progress due to absence of reception of the print completion notification indicating the printing of the print data is complete, and the print management unit determines that printing by the image forming apparatus is currently not in progress due to a timeout of the printing progress information indicating that the at least one page of the print data has not been printed by the image forming apparatus.

2. The print management apparatus according to claim 1, wherein the print management unit is further configured to output alert information in response to the print management unit detecting that the printing of the print data by the image forming apparatus is incomplete.

3. The management apparatus according to claim 2, wherein the print management unit stops transmission of print data of the subject job and subsequent print job, in response to the print management unit outputting alert information.

4. The print management apparatus according to claim 1, wherein the print management apparatus is a print server.

5. An image forming system comprising:

an image forming apparatus configured to form print data into an image; and a print management apparatus that manages printing performed by the image forming apparatus, wherein the print management apparatus comprises:

a processor that controls the print management apparatus to implement a print management unit configured to acquire, from a host server, print data to be processed by an image forming apparatus, and receive printing progress information that indicates whether at least one page of the print data has been printed by the image forming apparatus, a print completion notification that indicates printing of the print data by the image forming apparatus is complete, and an error resolution notification that indicates resumption of suspended printing of the print data by the image forming apparatus due to an error condition suspending the printing of the print data by the image forming apparatus;

a storage configured to store the print data acquired by the print management unit; and a print driver configured to transmit the print data stored in the storage to the image forming apparatus, wherein the print management unit is further configured to determine that partial printing of less than all pages of the print data by the image forming apparatus has occurred when:

the print management unit determines that the image forming apparatus is not in an error state due to the error resolution notification indicating resumption of suspended printing of the print data by the image forming apparatus, the print management unit determines that printing by the image forming apparatus is currently in progress due to absence of reception of the print completion notification indicating the printing of the print data is complete, and the print management unit determines that printing by the image forming apparatus is currently not in progress due to a timeout of the printing progress information indicating that the at least one page of the print data has not been printed by the image forming apparatus.

6. The image forming system according to claim 5, wherein the print management apparatus is a print server.

7. A non-transitory computer readable medium storing a program causing a computer to realize a method of managing printing of an image forming apparatus, the method comprising:

acquiring from a host server, by a print management unit, print data to be processed by an image forming apparatus;

receiving printing progress information that indicates whether at least one page of the print data has been printed by the image forming apparatus, a print completion notification that indicates printing of the print data by the image forming apparatus is complete, and an error resolution notification that indicates resumption of suspended printing of the print data by the image forming apparatus due to an error condition suspending the printing of the print data by the image forming apparatus; and determining that partial printing of less than all pages of the print data by the image forming apparatus has occurred when:

the image forming apparatus is not in an error state due to the error resolution notification indicating resumption of suspended printing of the print data by the image forming apparatus, printing by the image forming apparatus is currently in progress due to absence of reception of the print completion notification indicating the printing of the print data is complete, and printing by the image forming apparatus is currently not in progress due to a timeout of the printing progress information indicating that the at least one page of the print data has not been printed by the image forming apparatus.

8. The non-transitory computer readable medium according to claim 7, wherein the print management apparatus is a print server.

* * * * *